(12) United States Patent
Jang (10) Patent No.: US 7,093,970 B2
(45) Date of Patent: Aug. 22, 2006

(54) BACKLIGHT UNIT, LIQUID CRYSTAL DISPLAY DEVICE USING THE SAME, AND METHOD OF FABRICATING THE SAME

(75) Inventor: Myong-Gi Jang, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 224 days.

(21) Appl. No.: 10/742,754

(22) Filed: Dec. 23, 2003

(65) Prior Publication Data

US 2004/0227870 A1 Nov. 18, 2004

(30) Foreign Application Priority Data

Feb. 17, 2003 (KR) ........................ 10-2003-0009691

(51) Int. Cl.
*G02F 1/333* (2006.01)
*F21V 7/04* (2006.01)

(52) U.S. Cl. .................... 362/632; 362/633; 362/634; 349/58

(58) Field of Classification Search ................ 362/26, 362/600, 632, 633, 634, 614, 613; 349/58–71
See application file for complete search history.

(56) References Cited

U.S. PATENT DOCUMENTS

| 6,066,920 A | * | 5/2000 | Torihara et al. ............... 315/50 |
| 6,593,979 B1 | * | 7/2003 | Ha et al. ........................ 349/58 |
| 2004/0135936 A1 | * | 7/2004 | Lee ............................. 349/64 |

FOREIGN PATENT DOCUMENTS

JP 06067179 A * 3/1994

* cited by examiner

*Primary Examiner*—John Anthony Ward
*Assistant Examiner*—Anabel Ton
(74) *Attorney, Agent, or Firm*—Morgan, Lewis & Bockius, LLP

(57) ABSTRACT

A backlight unit for a liquid crystal display device includes a bottom cover having a first plane portion and a first side portion combined by a first coupling system, a reflector over the bottom cover and having a second plane portion and a second side portion corresponding to the first plane portion and the first side portion, respectively, at least one cold cathode fluorescent lamp over the second plane portion, an optical sheet over the at least one cold cathode fluorescent lamp, and a guide panel overlapping a rim portion of the optical sheet, wherein the guide panel and the bottom cover are combined using a second coupling system.

23 Claims, 5 Drawing Sheets

BACKLIGHT UNIT, LIQUID CRYSTAL DISPLAY DEVICE USING THE SAME, AND METHOD OF FABRICATING THE SAME

The present invention claims the benefit of Korean Patent Application No. 2003-9691, filed in Korea on Feb. 17, 2003, which is hereby incorporated by reference.

BACKGROUND OF THE INVENTION

1. Field of the Invention

The present invention relates to a display device and a method of fabricating a display device, and more particularly, to a backlight unit, a liquid crystal display device using a backlight unit, and a method of fabricating a liquid crystal display device.

2. Discussion of the Related Art

As the information age progresses, flat panel display (FPD) devices having light weight, thin profile, and low power consumption characteristics are being developed and commonly used as a substitute for cathode ray tube (CRT) devices. Generally, display devices may be classified according to their ability for self-emission, and may include emissive display devices and non-emissive display devices. The emissive display devices display images by taking advantage of their ability to self-emit light, and the non-emissive display devices require a light source since they do not emit light by themselves. For example, plasma display panel (PDP) devices, field emission display (FED) devices, and electroluminescent display (ELD) devices are commonly used as emissive display devices. Liquid crystal display (LCD) devices may be categorized as non-emissive display devices commonly used in notebook and desktop computers because of their high resolution, capability of displaying colored images, and high quality image display.

An LCD module of the LCD devices include an LCD panel for displaying images to an exterior and a backlight unit for supplying light to the LCD panel. The LCD panel includes two substrates facing and spaced apart from each other, and a liquid crystal material interposed therebetween. Liquid crystal molecules of the liquid crystal material have a dielectric constant and refractive index anisotropic characteristics due to their long, thin shape. In addition, two electric field generating electrodes are formed on the two substrates, respectively. Accordingly, an orientation alignment of the liquid crystal molecules can be controlled by supplying a voltage to the two electrodes, wherein transmittance of the LCD panel is changed according to polarization properties of the liquid crystal material. However, since the LCD panel is a non-emissive-type display device, an additional light source is required. Thus, a backlight unit is disposed under the LCD panel, wherein the LCD device displays images using light produced by the backlight unit. In general, backlight units may be classified into two types according to a disposition of the light source, such as side-type and direct-type. As display areas of the LCD devices become increasing larger, direct-type backlight units including a plurality of light source have become commonly used in order to provide high brightness.

Figure 1:
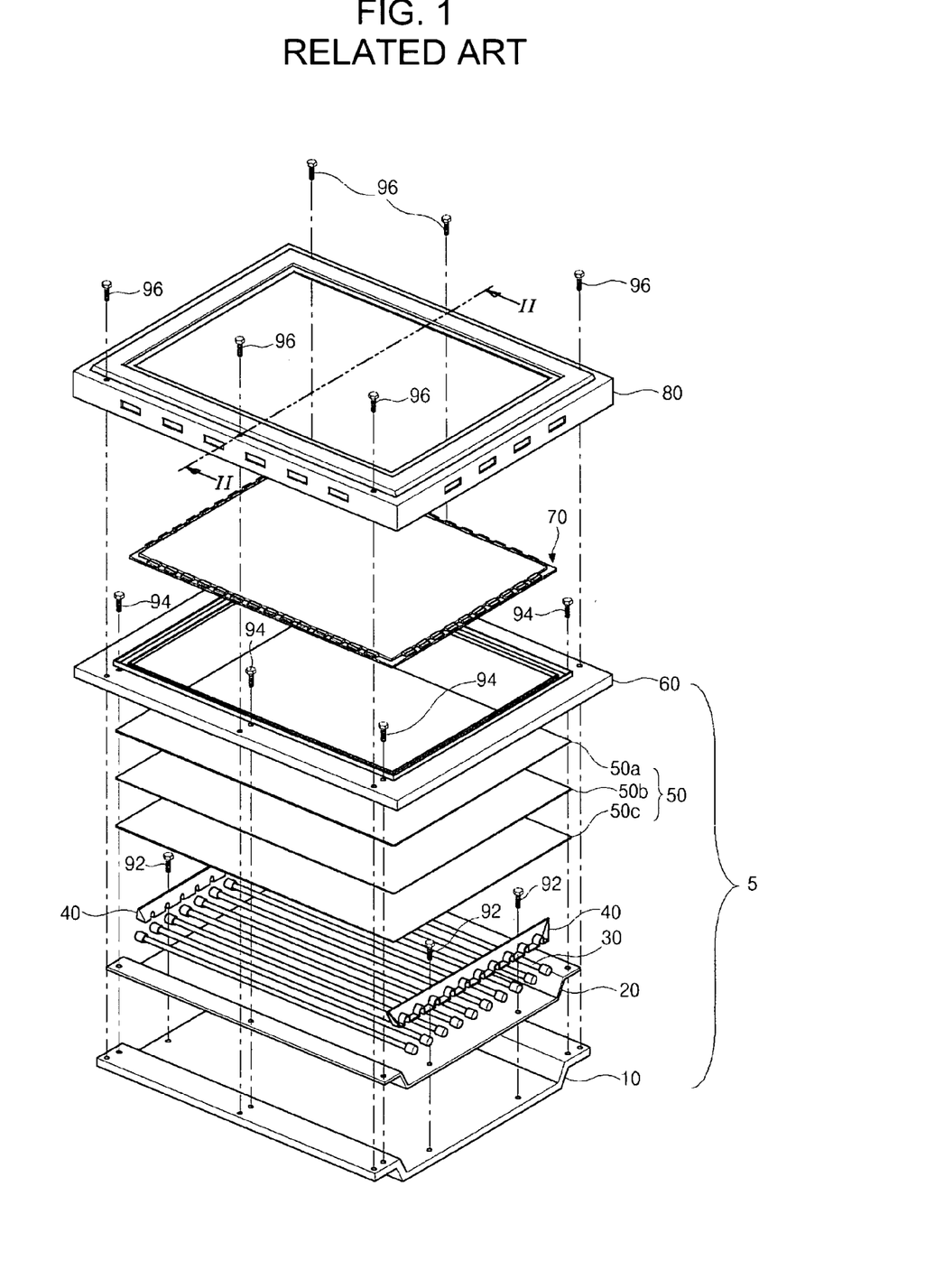
FIG. 1 is an assembly view of a liquid crystal display module having a direct type backlight unit according to the related art.

FIG. 1 is an assembly view of a liquid crystal display module having a direct type backlight unit according to the related art. In FIG. 1, an LCD module includes an LCD panel 70, a direct-type backlight unit 5, and a plurality of combining elements thereof. The direct-type backlight unit 5 includes a bottom cover 10, a reflector 20, a plurality of cold cathode fluorescent lamps (CCFLs) 30, a pair of side supporters 40, an optical sheet 50, and a guide panel 60. The bottom cover 10 is commonly formed of metal or synthetic resin material and functions as a lower case. The reflector 20 is formed of metal material having one of a white and silver color, and is combined with the bottom cover 10. The plurality of CCFLs 30 are disposed parallel to each other over the reflector 20, wherein the pair of side supporters 40 cross two ends of each of the CCFL 30 to fix the plurality of CCFLs 30. The optical sheet 50 includes a plurality of diffusing sheets 50a, 50b, and 50c that cover the plurality of CCFLs 30 and the pair of side supporters 40. The guide panel 60 covers a rim portion of the optical sheet 50.

The plurality of CCFLs 30 are fixed by combining the pair of side supporters 40 and the bottom cover 10 using a plurality of first bolts 92. Thus, the direct-type backlight unit 5 is formed of a single body and includes the guide panel 60 and the bottom cover 10 combined together using a plurality of second bolts 94. In addition, an LCD panel 70 is disposed above the direct-type backlight unit 5, and a top cover 80 covering rim of the LCD panel 70 is combined with the bottom cover 10 using a plurality of third bolts 96 to complete the LCD module. Accordingly, light emitted from the plurality of CCFLs 30 is reflected by the reflector 20 and enters the optical sheet 50, and is uniformly supplied across an entire surface of the LCD panel 70 to display images having high brightness.

Figure 2:
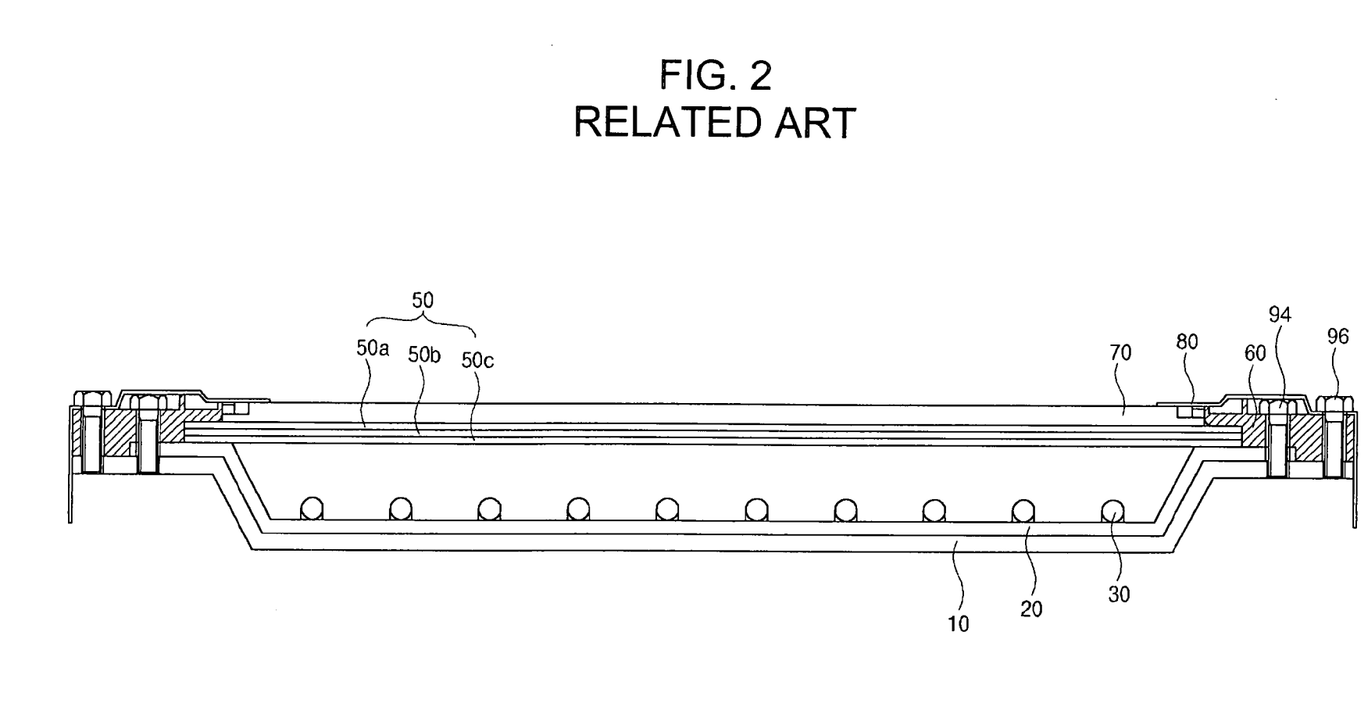
FIG. 2 is a cross sectional view along II—II of FIG. 1 showing the liquid crystal display module according to the related art.

FIG. 2 is a cross sectional view along II—II of FIG. 1 showing the liquid crystal display module according to the related art. In FIG. 2, the guide panel 60 is combined with the bottom cover 10 using the plurality of second bolts 94, and the top cover 80 is combined with the bottom cover 10 using the plurality of third bolts 96. Although not shown, a pair of side supporters crossing two ends of each CCFL 30 is combined with the bottom cover 10 using the plurality of first bolts 92.

According to the related art, the entire LCD module must be disassembled and re-assembled to change or repair the direct-type backlight unit, i.e., the plurality of CCFLs 30. In general, the CCFLs 30 remain ON for an extended period of time and consume relatively large amounts of power. As a result, lifetimes of the CCFLs 30 are shortened and occasionally malfunction. Since the direct-type backlight unit includes the plurality of CCFLs 30, each of the CCFLs 30 may need to be changed or repaired more frequently. Thus, to change or repair any of the CCFLs 30, the entire LCD module must be disassembled and then re-assembled. In FIGS. 1 and 2, the top cover 80 and the LCD panel 70 are disassembled from the direct-type backlight unit 5 by unscrewing the plurality of third bolts 96. Then, the guide panel 60 is disassembled from the optical sheet 50 by unscrewing the plurality of second bolts 94, and then the side supporters 40 are disassembled from the bottom cover 10 by unscrewing the plurality of first bolts 92. Since the disassembled elements must be re-assembled after changing or repairing any of the CCFLs 30, a process of changing or repairing the CCFLs 30 is complicated and time consuming. Furthermore, since the LCD panel 70 is exposed during the process of changing or repairing the CCFLs 30, the LCD panel 70 may become contaminated and degrade image display quality. Accordingly, the direct-type backlight unit 5 must be changed even when a change or repair of one of the CCFLs 30 is necessary. Thus, production costs increase and efficiency of materials decreases.

SUMMARY OF THE INVENTION

Accordingly, the present invention is directed to a liquid crystal display device and a method of fabricating a liquid crystal display device that substantially obviates one or more of the problems due to limitations and disadvantages of the related art.

An object of the present invention is to provide a liquid crystal display device capable of being efficiently repaired.

Another object of the present invention is to provide a method of fabricating a liquid crystal display device capable of being efficiently repaired.

Another object of the present invention is to provide a liquid crystal display device capable minimizing contamination of the liquid crystal display panel during repair.

Another object of the present invention is to provide a method of fabricating a liquid crystal display device capable minimizing contamination of the liquid crystal display panel during repair.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit for a liquid crystal display device includes a bottom cover having a first plane portion and a first side portion combined by a first coupling system, a reflector over the bottom cover and having a second plane portion and a second side portion corresponding to the first plane portion and the first side portion, respectively, at least one cold cathode fluorescent lamp over the second plane portion, an optical sheet over the at least one cold cathode fluorescent lamp, and a guide panel overlapping a rim portion of the optical sheet, wherein the guide panel and the bottom cover are combined using a second coupling system.

In another aspect, a liquid crystal display module includes a bottom cover having a first plane portion and a first side portion combined by a first coupling system, a reflector over the bottom cover and having a second plane portion and a second side portion corresponding to the first plane portion and the first side portion, respectively, at least one cold cathode fluorescent lamp over the second plane portion, an optical sheet over the at least one cold cathode fluorescent lamp, a guide panel overlapping a rim of the optical sheet, the guide panel and the bottom cover being combined by a second coupling system, a liquid crystal display panel over the guide panel, and a top cover overlapping a rim portion of the liquid crystal display panel, wherein the top cover and the bottom cover are combined by a fourth coupling system.

In another aspect, a method of fabricating a backlight unit for a liquid crystal display device includes combining a bottom cover having a first plane portion and a first side portion of a bottom cover using a first coupling system, providing a reflector over the bottom cover and having a second plane portion and a second side portion corresponding to the first plane portion and the first side portion, respectively, providing at least one cold cathode fluorescent lamp over the second plane portion, providing an optical sheet over the at least one cold cathode fluorescent lamp, providing a guide panel overlapping a rim portion of the optical sheet, and combining the guide panel and the bottom cover using a second coupling system.

In another aspect, a method of fabricating a liquid crystal display module includes combining a first plane portion and a first side portion of a bottom cover using a first coupling system, providing a reflector over the bottom cover, the reflector having a second plane portion and a second side portion corresponding to the first plane portion and the first side portion, respectively, providing at least one cold cathode fluorescent lamp over the second plane portion, providing an optical sheet over the at least one cold cathode fluorescent lamp, providing a guide panel to overlap a rim portion of the optical sheet, coupling the guide panel and the bottom cover using a second coupling system, providing a liquid crystal display panel over the guide panel, providing a top cover to overlap a rim portion of the liquid crystal display panel, and coupling the top cover and the bottom cover using a fourth coupling system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
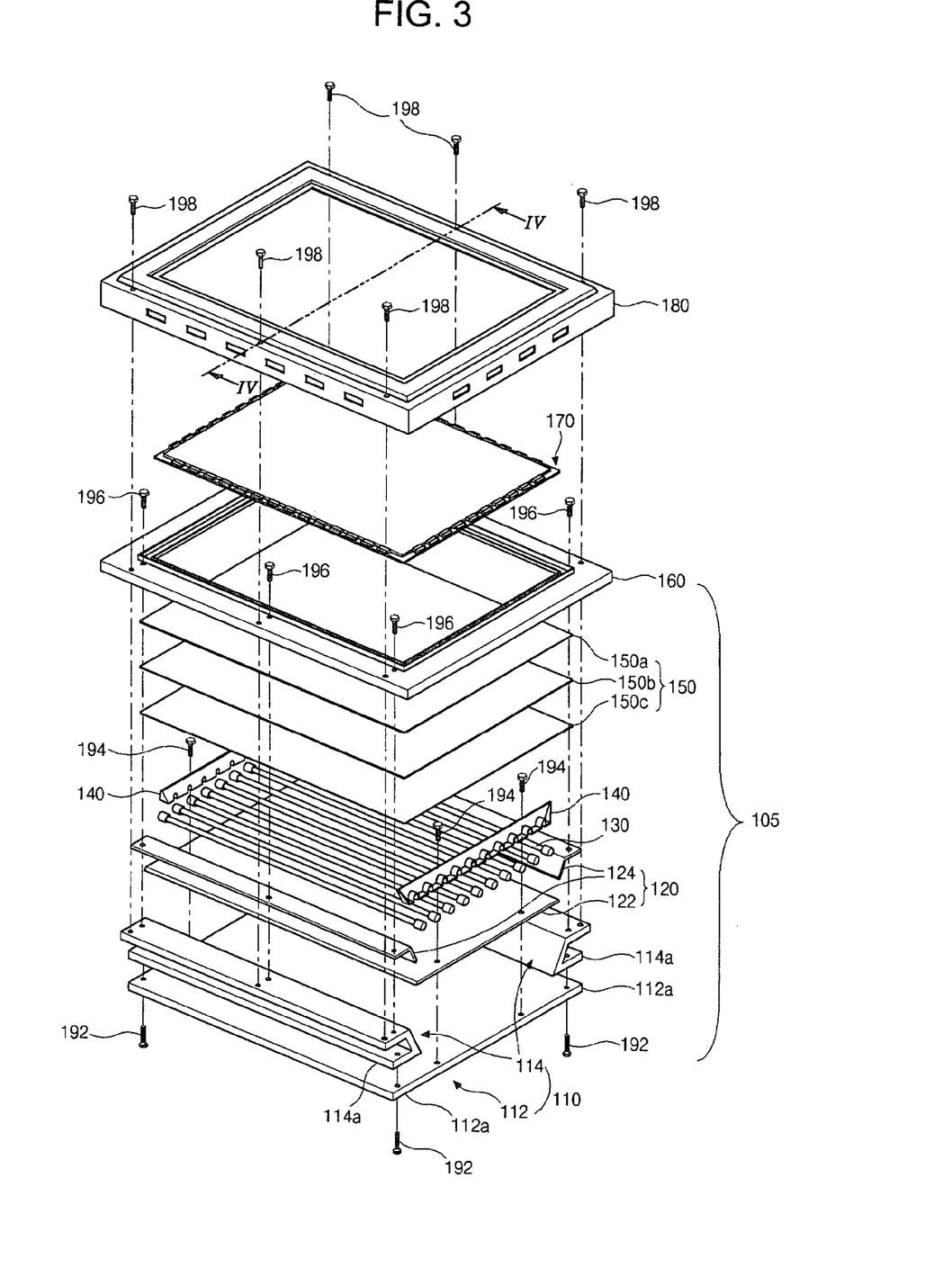
FIG. 3 is an assembly view of an exemplary liquid crystal display module according to the present invention.

FIG. 3 is an assembly view of an exemplary liquid crystal display module according to the present invention. In FIG. 3, an LCD module may include an LCD panel 170 and a backlight unit 105, such as a direct-type backlight unit. The backlight unit 105 may include a bottom cover 110, a reflector 120, a plurality of CCFLs 130, a pair of side supporters 140, an optical sheet 150, and a guide panel 160, wherein the bottom cover 110 may be formed of one of metal and-synthetic resin material. The reflector 120 may be formed of metal material having one of a white and silver color, and may be combined with the bottom cover 110. The plurality of CCFLs 130 may be disposed parallel to each other on the reflector 120, wherein the pair of side supporters 140 may cross two ends of each of the CCFLs 130 to fix the plurality of CCFLs 130. The optical sheet 150 may include a plurality of diffusing sheets 150a, 150b, and 150c to cover the plurality of CCFLs 130 and the pair of side supporters 140. The guide panel 160 may cover rim portions of the optical sheet 150.

The bottom cover 110 may function as a lower case that may be disassembled into a first plane portion 112 to function as a bottom and a first side portion 114 to function as a sidewall. In addition, the reflector 120 may be disassembled into a second plane portion 122 and a second side portion 124 corresponding to the first plane portion 112 and the first side portion 114, respectively. The second plane portion 122 may be disposed on an inner surface of the first plane portion 112, and the second side portion 124 may be disposed on an inner surface of the first side portion 114. The first plane portion 112 and the first side portion 114 may be combined using a first coupling system 192, such as a plurality of first bolts, fixed to the first side portion 114 through the first plane portion 112. The first plane portion 112 may include a first combination part 112a that may extend beyond the first side portion 114, wherein the first side portion 114 may include a second combination part 114a bent along an outward direction to overlap the first combination part 112a. The first coupling system 192 may be fixed to the second combination part 114a through the first combination part 112a along an upward direction from an exterior side of the first plane portion 112.

The plurality of CCFLs 130 may be disposed on the second plane portion 122 of the reflector 120, wherein the plurality of CCFLs 130 maybe fixed by combining the pair of side supporters 140 with the reflector 120 and the bottom cover 110 using a second coupling system 194, such as a plurality of second bolts. The second coupling system 194 may be fixed to the first plane portion 112 of the bottom cover 110 through the pair of side supporters 140 and the second plane portion 122 of the reflector 120. Accordingly, the second plane portion 122 of the reflector 120 may be fixed to the first plane portion 112 of the bottom cover 110 using the second coupling system 194.

In FIG. 3, the guide panel 160, the optical sheet 150, and the bottom cover 110 may be combined using a third coupling system 196, such as a plurality of third bolts, wherein the third coupling system 196 may be fixed to the first side portion 114 of the bottom cover 110 through the guide panel 160 and the second side portion 124 of the reflector 120. Accordingly, the second side portion 124 of the reflector 120 may be fixed to the first side portion 114 of the bottom cover 110 using the third coupling system 196. After combining the bottom cover 110, the reflector 120, the plurality of CCFLs 130, the pair of side supporters 140, the optical sheet 150, and the guide panel 160, a backlight unit having a single body may be obtained.

In FIG. 3, the LCD panel 170 may be disposed over the backlight unit 105, wherein a top cover 180 covering the rim of the LCD panel 170 and the LCD panel 170 may be combined with the backlight unit 105 using a fourth coupling system 198, such as a plurality of fourth bolts. The fourth coupling system 198 may be fixed to the first side portion 114 of the bottom cover 110 through the top cover 180 and the guide panel 160.

Figure 4:
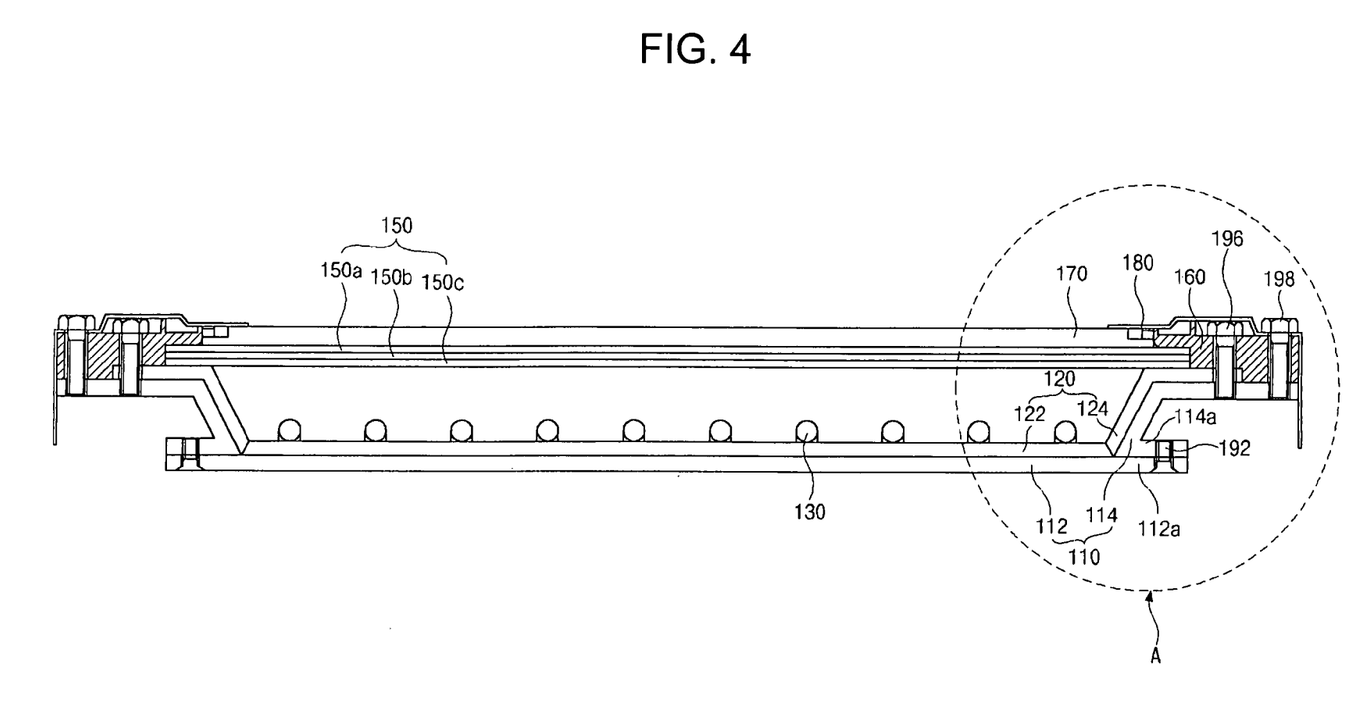
FIG. 4 is a cross sectional view along IV—IV of FIG. 3 of the exemplary liquid crystal display module according to the present invention.

FIG. 4 is a cross sectional view along IV—IV of FIG. 3 of the exemplary liquid crystal display module according to the present invention. In FIG. 4, the bottom cover 110 may include the first plane portion 112 having a first combination part 112a and the first side portion 114 having a second combination part 114a overlapping the first combination part 112a. The reflector 120 may include a second plane portion 122 disposed on an inner surface of the first plane portion 112, and a second side portion 124 disposed on an inner surface of the first side portion 114. Accordingly, the plurality of CCFLs 130 may be disposed over the second plane portion 122. In addition, the optical sheet 150 may include a plurality of diffusing sheets 150a, 150b, and 150c, and the guide panel 160 may cover rim portions of the optical sheet 150. Moreover, the LCD panel 170 may be disposed over the guide panel 160 and the top cover 180 may cover rim portions of the LCD panel 170.

In FIG. 4, the bottom cover 110 may be combined by fixing the first coupling system 192 to the second combination part 114a of the first side portion 114 through the first combination part 112a of the first plane portion 112. The backlight unit 105 may be completed by fixing the third coupling system 196 to the first side portion 114 of the bottom cover 110 through the guide panel 160 and the second side portion 124 of the reflector 120. Finally, the LCD module may be obtained by fixing the fourth coupling system 198 to the first side portion 114 of the bottom cover 110 through the top cover 180.

Although not shown, a pair of side supporters 140 (in FIG. 3) may cross two ends of the plurality of CCFLs 130, and the plurality of CCFLs 130 may be combined by fixing the second coupling system 194 to the first plane portion 112 of the bottom cover 110 though the pair of side supporters 140 (in FIG. 3) and the second plane portion 122 of the reflector 120.

According to the present invention, the first plane portion 112 of the bottom cover 110 and the second plane portion 122 of the reflector 120 may be disassembled from the first side portion 114 of the bottom cover 110 and the second side portion 124 of the reflector 120, respectively. Thus, when one of the plurality of CCFLs 130 malfunctions, change or repair the plurality of CCFLs 130 may be simplified.

Figure 5:
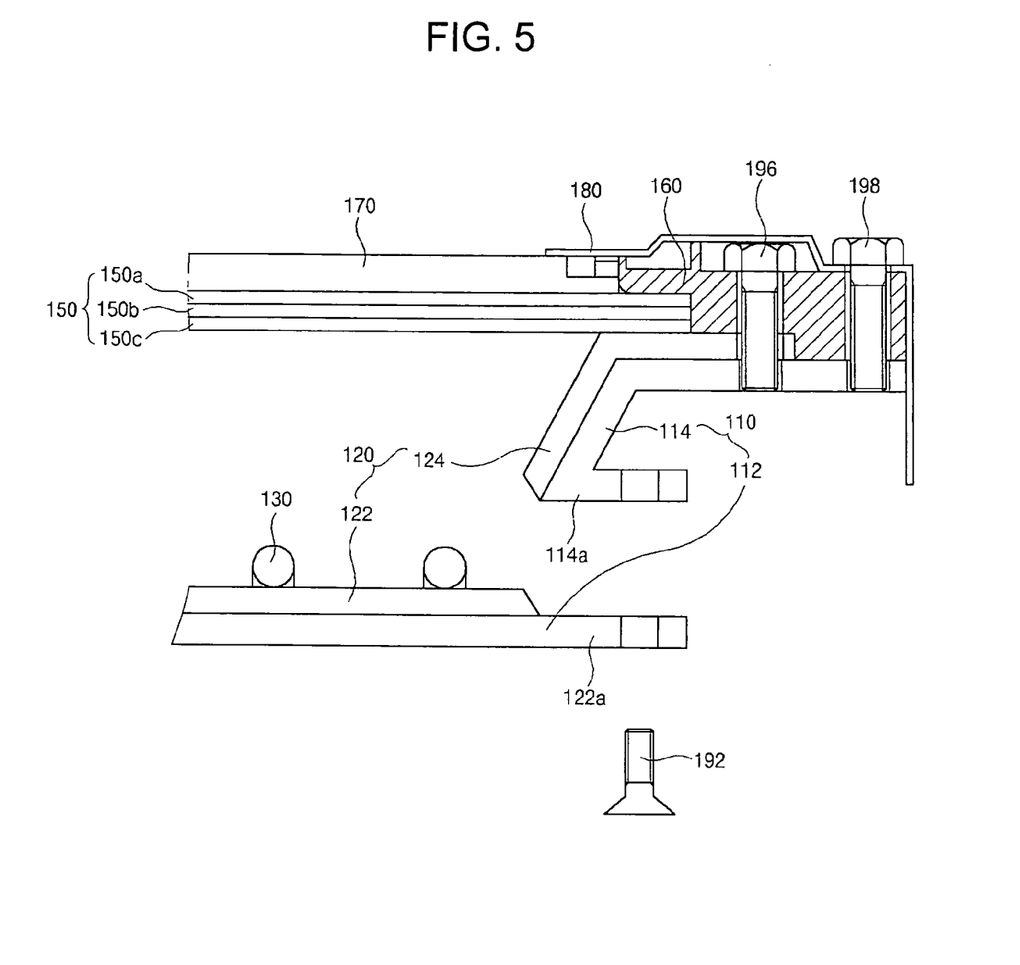
FIG. 5 is an enlarged view of section A of FIG. 4 according to the present invention.

FIG. 5 is an enlarged view of section A of FIG. 4 according to the present invention. In FIG. 5, since the plurality of CCFLs 130 may remain ON for an extended period of time, it may be necessary to frequently change or repair the plurality of CCFLs 130. An exemplary process for disassembling and reassembling the backlight unit 150 according to the present invention is shown with reference to FIGS. 3, 4, and 5.

For changing or repairing the plurality of CCFLs 130, the first coupling system 192 may be removed to disassemble the first plane portion 112 and the first side portion 114 of the bottom cover 110. In addition, the second plane portion 122 of the reflector 120 may be disposed on the inner surface of the first plane portion 112, and the plurality of CCFLs 130 may be disposed over the second side portion 122. Moreover, the plurality of CCFLs 130 may be fixed on the second plane portion 122 by combining the pair of side supporters 140 and the first plane portion 112 using the second coupling system 194. After removing the first coupling system 192, the second coupling system 194 may be removed to disassemble the pair of side supporters 140 and the first plane portion 112. Thus, the plurality of CCFLs 130 may be disassembled from the second plane portion 122 in order to change or repair the plurality of CCFLs 130.

After changing or repairing the plurality of CCFLs 130, the elements of the backlight unit 105 may be re-assembled by a process opposite to the disassembly of the backlight unit 105. After disposing the pair of side supporters 140 over the plurality of CCFLs 130 to cross two ends of the plurality of CCFLs 130, the second coupling system 194 may be attached to the first plane portion 112 through the pair of side supporters 140 and the second plane portion 122. Then, the plurality of CCFLs 130 and the pair of side supporters 140 may be attached to the LCD module such that the first combination part 112a of the first plane portion 112 may overlap the second combination part 114a of the first side portion 114. Next, the first coupling system 192 maybe attached to the second combination part 114a through the first combination part 112a to re-assemble the backlight unit 150.

According to the present invention, disassembling and re-assembling procedures for repairing or changing the plurality of CCFLs may be simplified. In addition, since the LCD panel may not be exposed during the disassembling and re-assembling procedures, contamination of the LCD panel may be minimized. Moreover, since only malfunctioning ones of the plurality of CCFLs may be changed or repaired, production costs may be reduced and material efficiency may be improved.

It will be apparent to those skilled in the art that various modifications and variations can be made in a liquid crystal display device and a method of fabricating a liquid crystal display device of-the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:
    a bottom cover having a first plane portion and opposing first side portions combined by a first coupling system;
    a reflector over the bottom cover and having a second plane portion and second side portions corresponding to the first plane portion and the opposing first side portions, respectively;
    at least one cold cathode fluorescent lamp over the second plane portion and between the opposing first side portions;
    an optical sheet over the at least one cold cathode fluorescent lamp; and
    a guide panel overlapping a rim portion of the optical sheet,
    wherein the guide panel and the bottom cover are combined using a second coupling system.

2. The backlight unit according to claim 1, wherein the first coupling system includes a plurality of first bolts fixed to the opposing first side portions through the first plane portion.

3. The backlight unit according to claim 2, further comprising a first combination part extending from the first plane portion beyond the opposing first side portions and a second combination part bent outward from the opposing first side portions and overlapping the first combination part.

4. The backlight unit according to claim 3, wherein the plurality of first bolts are fixed to the second combination part through the first combination part.

5. The backlight unit according to claim 1, wherein the second coupling system includes a plurality of second bolts fixed to the opposing first side portions through the guide panel and the second side portions.

6. The backlight unit according to claim 1, wherein the at least one cold cathode fluorescent lamp includes a plurality of cold cathode fluorescent lamps disposed parallel to each other.

7. The backlight unit according to claim 1, further comprising a pair of side supporters crossing the at least one cold cathode fluorescent lamp.

8. The backlight unit according to claim 7, wherein the pair of side supporters and the second plane portion are combined using a third coupling system.

9. The backlight unit according to claim 8, wherein the third coupling system includes a plurality of third bolts fixed to the first plane portion through the pair of side supporters and the second plane portion.

10. The backlight unit according to claim 1, wherein the optical sheet includes a plurality of diffusing sheets covering the at least one cold cathode fluorescent lamp.

11. A liquid crystal display module, comprising:
    a bottom cover having a first plane portion and opposing first side portions combined by a first coupling system;
    a reflector over the bottom cover and having a second plane portion and second side portions corresponding to the first plane portion and the opposing first side portions, respectively;
    at least one cold cathode fluorescent lamp over the second plane portion and between the opposing first side portions;
    an optical sheet over the at least one cold cathode fluorescent lamp;
    a guide panel overlapping a rim of the optical sheet, the guide panel and the bottom cover being combined by a second coupling system;
    a liquid crystal display panel over the guide panel; and
    a top cover overlapping a rim portion of the liquid crystal display panel,
    wherein the top cover and the bottom cover are combined by a third coupling system.

12. The liquid crystal display module according to claim 11, wherein the third coupling system includes a plurality of bolts fixed to the opposing first side portions through the top cover.

13. A method of fabricating a backlight unit for a liquid crystal display device, comprising:
    combining a bottom cover having a first plane portion and opposing first side portions of a bottom cover using a first coupling system;
    providing a reflector over the bottom cover and having a second plane portion and second side portions corresponding to the first plane portion and the opposing first side portions, respectively;
    providing at least one cold cathode fluorescent lamp over the second plane portion and between the opposing first side portions;
    providing an optical sheet over the at least one cold cathode fluorescent lamp;
    providing a guide panel overlapping a rim portion of the optical sheet; and
    combining the guide panel and the bottom cover using a second coupling system.

14. The method according to claim 13, wherein the first coupling system includes a plurality of first bolts fixed to the opposing first side portions through the first plane portion.

15. The method according to claim 14, further comprising a first combination part extending from the first plane portion beyond the opposing first side portions and a second combination part bent outward from the opposing first side portions and overlapping the first combination part.

16. The method according to claim 15, wherein the plurality of first bolts are fixed to the second combination part through the first combination part.

17. The method according to claim 13, wherein the second coupling system includes a plurality of second bolts fixed to the opposing first side portions through the guide panel and the second side portions.

18. The method according to claim 13, wherein the at least one cold cathode fluorescent lamp includes a plurality of cold cathode fluorescent lamps disposed parallel to each other.

19. The method according to claim 13, further comprising providing a pair of side supporters to cross the at least one cold cathode fluorescent lamp and combining the pair of side supporters and the second plane portion using a third coupling system.

20. The method according to claim 19, wherein the third coupling system includes a plurality of third bolts fixed to the opposing first plane portions through the pair of side supporters and the second plane portions.

21. The method according to claim 13, wherein the optical sheet includes a plurality of diffusing sheets covering the at least one cold cathode fluorescent lamp.

22. A method of fabricating a liquid crystal display module, comprising:
  combining a first plane portion and opposing first side portions of a bottom cover using a first coupling system;
  providing a reflector over the bottom cover, the reflector having a second plane portion and second side portions corresponding to the first plane portion and the opposing first side portions, respectively;
  providing at least one cold cathode fluorescent lamp over the second plane portion and between the opposing first side portions;
  providing an optical sheet over the at least one cold cathode fluorescent lamp;
  providing a guide panel to overlap a rim portion of the optical sheet;
  coupling the guide panel and the bottom cover using a second coupling system;
  providing a liquid crystal display panel over the guide panel;
  providing a top cover to overlap a rim portion of the liquid crystal display panel; and
  coupling the top cover and the bottom cover using a fourth coupling system.

23. The method according to claim 2, wherein the fourth coupling system includes a plurality of fourth bolts fixed to the opposing first side portions through the top cover.

* * * * *